United States Patent [19]
Schwager et al.

[11] Patent Number: 5,166,113
[45] Date of Patent: Nov. 24, 1992

[54] ZIEGER-NATTA-TYPE CATALYST SYSTEMS

[76] Inventors: Harald Schwager, 7 Ziegelofenweg, 6720 Speyer; Peter Koelle, 19 An der Froschlache, 6700 Ludwigshafen; Juergen Kerth, 15 Wattenheimer Strasse, 6719 Carlsberg; Ralf Zolk, 7 Weinbietstrasse, 6714 Weisenheim, all of Fed. Rep. of Germany

[21] Appl. No.: 759,980

[22] Filed: Sep. 17, 1991

Related U.S. Application Data

[63] Continuation of Ser. No. 606,852, Oct. 31, 1990, abandoned.

[30] Foreign Application Priority Data

Nov. 6, 1989 [DE] Fed. Rep. of Germany ....... 3936856

[51] Int. Cl.$^5$ ............................................. C08F 4/654
[52] U.S. Cl. .................................... 502/107; 502/120; 502/125; 502/127; 526/125; 526/142; 526/351
[58] Field of Search ................ 502/107, 120, 125, 127

[56] References Cited

FOREIGN PATENT DOCUMENTS

| | | |
|---|---|---|
| 0014523 | 8/1980 | European Pat. Off. . |
| 0023425 | 2/1981 | European Pat. Off. . |
| 0045975 | 2/1982 | European Pat. Off. . |
| 0086473 | 8/1983 | European Pat. Off. . |
| 0171200 | 2/1986 | European Pat. Off. . |
| 0195497 | 9/1986 | European Pat. Off. . |
| 0341723 | 11/1989 | European Pat. Off. . |
| 2111066 | 6/1983 | United Kingdom . |

*Primary Examiner*—Patrick P. Garvin

[57] ABSTRACT

Ziegler-Natta-type catalyst systems containing, as active constituents,
a) a titanium-containing solid component which also contains magnesium, halogen and a carboxylic acid ester, and, as cocatalyst,
b) an aluminum compound, wherein the carboxylic acid ester in the solid component is a diester of a carboxylic acid of the formula Ia or Ib

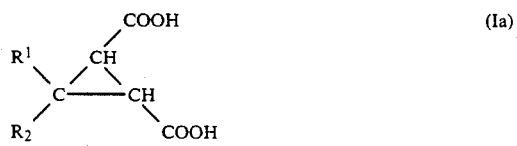

(Ia)

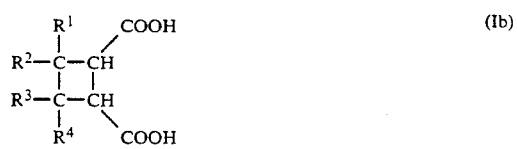

(Ib)

where $R^1$, $R^2$, $R^3$ and $R^4$ are identical or different and are hydrogen, $C_1$- to $C_{15}$-alkyl, $C_7$- to $C_{15}$-alkylaryl, or 5- to 7-membered cycloalkyl, which may itself carry $C_1$- to $C_{10}$-alkyl groups, are particularly suitable for the preparation of polypropylene and copolymers of propylene containing minor amounts of other $\alpha,\beta$-unsaturated olefinic compounds having from 2 to 12 carbon atoms.

11 Claims, No Drawings

ZIEGER-NATTA-TYPE CATALYST SYSTEMS

This application is a continuation of application Ser. No. 07/606,852, filed on Oct. 31, 1990 and now abandoned.

The present invention relates to novel Ziegler-Natta-type catalyst systems which contain, as active constituents,
- a) a titanium-containing solid component which also contains magnesium, halogen and a carboxylic acid ester, and, as cocatalyst,
- b) an aluminum compound, wherein the ester used is of a specific carboxylic acid.

The present invention furthermore relates to the preparation of catalyst systems of this type, to the preparation of propylene polymers using these catalyst systems, to the polymers obtainable by this process, and to films and moldings made from these polymers.

Ziegler-Natta-type catalyst systems have been disclosed, inter alia, in EP-B 14523, EP-A-23425, EP-A 45975 and EP-A 195 497. These systems are used, in particular, for polymerizing α-olefins and contain, inter alia, compounds of polyvalent titanium, aluminum halides and/or alkylaluminum compounds, and electron donors, in particular silicon compounds, ethers, carboxylic acid esters, ketones and lactones, which are used on the one hand in combination with the titanium compound and on the other hand as cocatalyst.

In order to ensure economical production of polyolefins, catalyst systems of this type must have, inter alia, high productivity. For the purposes of the invention, this is taken to mean the ratio between the amount of polymer formed and the amount of catalyst employed. It is also necessary for the resultant polymers to be as stereospecific as possible, i.e. the proportion of non-isotactic molecular structures in the homopolymers should not exceed from 2 to 2.5 %.

The prior art only provides a limited achievement of these two objects simultaneously. Thus, for example, EP-A 86473 discloses a catalyst system in which the electron donor, as a constituent of the titaniumcontaining solid component, is a carboxylic acid ester and the cocatalyst is, inter alia, a silicon compound; although this system has satisfactory productivity, it is in need of improvement with respect to the stereo-specificity of the resultant polymers. Furthermore, EP-A 171 200 describes a Ziegler-Natta catalyst system which contains, inter alia, a carboxylic acid ester as a constituent of the titanium-containing solid component, and silicon and aluminum compounds as cocatalysts. This system facilitates the preparation of polypropylenes of high stereospecificity, but, in addition to unsatisfactory productivity, has the further disadvantage of an excessively broad grain size distribution in the resultant polymer.

In addition to these properties, which are particularly important for processing of the polymers, a low halogen content in the polyolefin is also of importance in order to enable the use of such materials in combination with corrosion-susceptible materials. To this end, it is necessary, in particular, considerably to reduce the halogen content in the polymer.

Polymerization processes for the preparation of polyolefins are advantageously carried out in solution, in a slurry or in the gas phase. Compared with other polymerization processes, gas-phase polymerization is a particularly simple process. However, a reduction in the catalyst productivity and the stereospecificity and impairment of the morphological properties of the resultant polymers must be accepted. Thus, for example, GB-A 2,111,066 describes a catalyst system for polymerizing polyolefins which likewise contains, inter alia, a carboxylic acid ester as a constituent of the titanium-containing solid component and a silicon compound as cocatalyst. This catalyst system has high productivity, and the homopolymer products have good properties, in particular with respect to the stereospecificity, grain size distribution and proportion of very fine grains. However, as Comparative Experiment A below shows, these properties are considerably impaired if the polymerization is carried out not in solution but in the gas phase.

It is an object of the present invention to develop a novel catalyst system using which the outlined disadvantages can be substantially overcome and using which it is possible, in particular, to prepare polypropylene in high productivity, even in the gas phase, and which has high stereospecificity and good morphological properties, in particular an extremely low proportion of very fine grains.

We have found that this object is achieved by the novel catalyst system described in the claims.

The titanium compound used to prepare the titanium-containing solid component is generally a halide or alkoxide of trivalent or tetravalent titanium, preference being given to the chlorides, in particular titanium tetrachloride. The titanium-containing solid component advantageously contains a finely divided carrier, for which purpose silica, alumina and aluminosilicates have proven successful. A preferred carrier is $SiO_2 \cdot aAl_2O_3$: where a is from 0 to 2, in particular from 0 to 0.5.

In addition, the titanium-containing solid component is prepared in the presence, inter alia, of compounds of magnesium, for example magnesium halides, arylmagnesium compounds, alkylmagnesium compounds, alkoxymagnesium compounds and aryloxymagnesium compounds, particular preference being given to magnesium dichloride, magnesium dibromide and di($C_1$-$C_{10}$-alkyl)magnesium compounds. This component also contains halogen, preferably chlorine or bromine.

The titanium-containing solid component also contains, according to the invention, a diester of a 3- or 4-membered cycloalkyl-1,2-dicarboxylic acid of the formula Ia or Ib

(Ia)

(Ib)

where $R^1$, $R^2$, $R^3$ and $R^4$ are identical or different and are hydrogen, $C_1$- to $C_{15}$-alkyl, $C_7$- to $C_{15}$-alkylaryl, or 5- to 7-membered cycloalkyl, which may itself carry $C_1$- to $C_{10}$-alkyl groups. Preference is given to carboxylic acids in which $R^1$, $R^2$, $R^3$ and $R^4$ are hydrogen or $C^1$-$C^8$-alkyl.

The hydroxyl compound used is an alcohol which is conventional in esterification reactions, inter alia a $C_1$-

$C_{15}$-alkanol, a $C_5$-$C_7$-cycloalkanol, which may itself carry $C_1$-$C_{10}$-alkyl groups, or a $C_6$-$C_{10}$-phenol. Preferred esters contain a $C_1$-$C_8$-alkanol as the alcohol radical.

Examples of particularly suitable esters are, inter alia, the esters of cyclopropane-1,2-dicarboxylic acid, the hydroxyl compound used being, in particular, pentanol, hexanol, heptanol or octanol.

The titanium-containing solid component can be prepared in an otherwise conventional manner, as described, for example, in EP-A 45 975, EP-A 45 977, EP-A 86 473, EP-A 171 200 and GB-A 2,111,066.

The titanium-containing solid component is preferably prepared by the following three-step process.

In the first step, a solution of a magnesium-containing compound in a liquid alkane is first added to a finely divided carrier, preferably $SiO_2 \cdot aAl_2O_3$ where a is from 0 to 2, in particular from 0 to 0.5, which generally has a particle diameter of from 0.1 to 1000 μm, in particular from 10 to 300 μm, a pore volume of from 0.1 to 10 cm³/g, in particular from 1.0 to 4.0 cm³/g, and a specific surface area of from-: 10 to 1000 m²/g, in particular from 100 to 500 m²/g, and this mixture is then stirred at from 10 to 120° C. for from 0.5 to 5 hours. From 0.1 to 1 mol of the magnesium compound is preferably employed per mol of the carrier. A halogen or a hydrogen halide, in particular chlorine or hydrogen chloride, in an at least two-fold, preferably at least five-fold, molar excess, based on the magnesium-containing compound, is then added with constant stirring. After from about 30 to 120 minutes, the solid is separated from the liquid phase.

In the second step, the product obtained in this way is introduced into a liquid alkane and a $C_1$-$C_8$-alkanol, in particular ethanol, a halide or an alkoxide of trivalent or tetravalent titanium, in particular titanium tetrachloride, and the cycloalkyl-1,2-dicarboxylate to be employed according to the invention are then added. From 1 to 5 mol, in particular from 2 to 4 mol, of alkanol, from 2 to 20 mol, in particular from 4 to 10 mol, of trivalent or tetravalent titanium and from 0.01 to 1 mol, in particular from 0.1 to 1.0 mol, of the cycloalkyl-1,2-dicarboxylate are employed per mol of magnesium in the solid obtained in the first step. The mixture is stirred at from 10° to 150° C. for one hour or more, and the resultant solid is subsequently filtered off and washed with a liquid alkane, preferably with hexane or heptane.

In the third step, the solid obtained in the second step is extracted for several hours at from 100° to 150° C. with excess titanium tetrachloride or an excess of a solution of titanium tetrachloride in an inert solvent, preferably an alkylbenzene, the solvent containing 5 % by weight or more of titanium tetrachloride. The product is then washed with a liquid alkane until the content of titanium tetrachloride in the washings is less than 2 % by weight.

The titanium-containing solid component obtainable in this way is used together with a cocatalyst as a Ziegler-Natta catalyst system. Suitable cocatalysts are, in particular, aluminum compounds. In addition to an aluminum compound, an electron donor is preferably also employed as a further cocatalyst.

Besides trialkylaluminum, suitable aluminum components are also those in which one alkyl group has been replaced by alkoxy or halogen, for example by chlorine or bromine. Preference is given to trialkyl-aluminum compounds in which the alkyl groups each have from 1 to 8 carbon atoms, for example trimethylaluminum, triethylaluminum or methyldiethylaluminum.

In addition to the titanium-containing solid component and the aluminum compound, the catalyst system according to the invention furthermore preferably contains electron donors, such as monofunctional or polyfunctional carboxylic acids, carboxylic anhydrides and carboxylic acid esters, furthermore ketones, ethers, alcohols, lactones, or organophosphorus or organosilicon compounds. Preferred electron donors are organosilicon compounds of the formula II $$R_n^5 Si(OR^6)_{4-n} \qquad (II),$$

where
R⁵ is $C_1$-$C_{20}$-alkyl, 5- to 7-membered cycloalkyl, which may itself carry a $C_1$-$C_{10}$-alkyl group, or $C_6$-$C_{20}$-aryl or arylalkyl R⁶ is $C_1$-$C_{20}$-alkyl, and n is 1, 2 or 3. Particular preference is given to compounds where R⁵ is $C_1$-$C_8$-alkyl or 5- to 7-membered cycloalkyl, R⁶ is $C_1$-$C_4$-alkyl, and n is 1 or 2.

Of these compounds, dimethoxydiisopropylsilane, diethoxyisobutylisopropylsilane and dimethoxydicyclopentylsilane are particularly suitable.

Preferred catalyst systems are those in which the atomic ratio between aluminum from the aluminum compound and titanium from the titanium-containing solid component is from 10 : 1 to 800 : 1, in particular from 20 : 1 to 200 : 1, and the molar ratio between the aluminum compound and the electron donor c) is from 1:1 to 100:1, in particular from 2:1 to 80:1.

The catalyst system according to the invention is particularly suitable for preparing propylene polymers.

The preparation of polyolefins, in particular propylene polymers, can be carried out in conventional reactors used for the polymerization of propylene, either batchwise or preferably continuously, either as a suspension polymerization or preferably as a gas-phase polymerization. Examples of suitable reactors are continuous stirred reactors, which contain a fixed bed of finely divided polymer, usually kept in motion by suitable stirring means. It is of course also possible to carry out the reaction in a series of one or more consecutive reactors. The reaction duration is crucially dependent on the polymerization conditions chosen in each case. It is usually from 0.2 to 20 hours, mostly from 0.5 to 10 hours.

For the purposes of the present invention, propylene polymers are taken to mean homopolymers of propylene and copolymers of propylene containing minor amounts of other α,β-unsaturated olefinic compounds having from 2 to 12 carbon atoms, eg. α-monoolefins or bifunctional α-olefins, for example hexadi-1,5-ene. Particularly suitable comonomers are ethylene, but-1-ene, pent-1-ene, 4-methylpent-1-ene, hex-1-ene, hept-1-ene and oct-1-ene.

The copolymers obtained may have a block, random or alternating structure. The catalyst system according to the invention is also particularly suitable for preparing propylene-ethylene copolymers containing up to 10 % by weight of copolymerized ethylene and terpolymers of propylene with minor amounts of copolymerized ethylene and but-1-ene, and propylene-ethylene block copolymers which, in addition to polypropylene blocks, also contain blocks of copolymerized propylene-ethylene copolymers.

The polymerization reaction is expediently carried out at from 20° to 160° C. and from 1 to 100 bar, preferably at from 40° to 120° C. and from 10 to 80 bar. The molecular weights of the polyolefins formed can be controlled by adding regulators which are customary in polymerization technology, for example hydrogen, and adjusted to a narrower distribution. It is also possible to use inert solvents, for example toluene or hexane, an inert gas, such as nitrogen or argon, and minor amounts of polypropylene powder.

The propylene homopolymers and copolymers obtainable according to the invention can be prepared in molecular weights which are conventional for polyolefins, polymers having molecular weights of from 20,000 to 500,000 being preferred.

Using the catalyst system according to the invention, both the productivity and the stereospecificity in the polymerization of propylene are improved. The polymers obtainable in this way have a very low proportion of very fine grains (<0.25 mm) and a low chlorine content.

Due to their good mechanical properties, the propylene polymers prepared using the catalyst system according to the invention are particularly suitable for the production of films and moldings.

EXAMPLES

Example 1 a) Preparation of the titanium-containing solid component

In a first step, a 20% strength solution of n-butyloctylmagnesium in n-heptane was added to $SiO_2$ having a particle diameter of from 20 to 45 μm, a pore volume of 1.6 cm$^3$/g and a specific surface area of 335 m$^2$/g, 0.25 mol of the magnesium compound being employed per mol of $SiO_2$. The solution was stirred at 40° C. for 60 minutes under reflux and then cooled to 20° C., and 10 times the molar amount, based on the magnesium compound, of hydrogen chloride was then passed in. After 60 minutes, the solid product was separated from the solvent.

n-Heptane was added to the product from the first step, and 3 mol of ethanol per mol of magnesium were added with constant stirring. This mixture was stirred at 80° C. for 1 hour, and 6.7 mol of titanium tetrachloride and 0.3 mol of n-hexyl cyclopropane-1,2-dicarboxylate, in each case based on 1 mol of magnesium, were subsequently added. The mixture was then stirred at 100° C. for 2 hours, and the resultant solid was filtered off and washed 3 times with 100 ml of n-heptane in each case.

The solid obtained was extracted for 3 hours at 125° C. with a 10 % strength by volume solution of titanium tetrachloride in ethylbenzene. The solid product was then separated from the extractant by filtration and washed with n-heptane until the extractant only contained 0.3 % by weight of titanium tetrachloride.

The titanium-containing solid component contained
3.8 % by weight of Ti,
5.9 % by weight of Mg and
24.0 % by weight of Cl.

b) Polymerization 50 g of polypropylene powder (melt flow index 8 g/10 min), 10 mmol of triethylaluminum (in the form of a 1 molar solution in n-heptane), 1.0 mmol of dimethoxyisobutylisopropylsilane (in the form of a 1 molar solution in n-heptane), 10 l of hydrogen and 100 mg of the titanium-containing solid component prepared as in Example 1a) were introduced at 30° C. into a 10 l steel autoclave fitted with a stirrer. The reactor temperature was then increased to 70° C. over the course of 15 minutes, the reactor was pressurized to 28 bar by injecting gaseous propylene, and the polymerization was then carried out for 2 hours, the monomer consumed being continuously replaced by fresh monomer.

996 g of a propylene homopolymer having a mean molecular weight of 245,000 were obtained. The productivity of the catalyst system, defined as the ratio between the amount of polymer formed and the amount of titanium-containing solid component, the proportion of heptane-soluble components, which is a measure of the proportion of non-isotactic structural units, the proportion of very fine grains (<0.25 mm) and the chlorine content of the polymer are shown in the table below.

Example 2

A titanium-containing solid component was prepared using the procedure of Example 1a), but replacing the n-hexyl cyclopropane-1,2-dicarboxylate by the same molar amount of n-pentyl cyclopropane-1,2-dicarboxylate.

The titanium-containing solid component contained
3.6 % by weight of Ti,
5.9 % by weight of Mg and
24.3 % by weight of Cl.

This catalyst solid a) was used to polymerize propylene as described in Example 1b. 1500 kg of a propylene homopolymer having a mean molecular weight of 255,000 were obtained. The other results are given in the table below.

Comparative Example A

Propylene was polymerized under the conditions of Example 1 of the present patent, but with the difference that the catalyst used was that of Example 1 of GB-A 2,111,066. Besides titanium tetrachloride and magnesium chloride, the titanium-containing solid component a) in this catalyst contained, as electron donor, diisobutyl phthalate and phthalic anhydride. In addition to the titanium-containing solid component, triethylaluminum was used as the aluminum cocatalyst and phenyltriethoxysilane as a further electron donor.

The titanium-containing solid component a) contained
3.1 % by weight of Ti,
17.0 % by weight of Mg and
56.0 % by weight of Cl.

The table below shows the results of this Comparative Experiment A using the catalyst of Example 1 of GB-A 2,111,066 and those of the present invention (Examples 1 and 2).

As the table shows, the catalyst systems according to the invention give, under the conditions of gas-phase polymerization, higher productivities and stereospecificities and in particular a lower proportion of very fine grains in the polymer compared with the catalyst system in Example 1 of GBA 2,111,066.

TABLE

|  | Example 1 | Example 2 | Comparative Example A |
|---|---|---|---|
| Productivity (g of polypropylene/ g of titanium-containing solid component) | 9960 | 15000 | 9345 |
| Proportion of heptane-soluble components (% by weight) | 1.7 | 2.4 | 2.4 |
| Proportion of very | 1.0 | 1.2 | 82.4 |

TABLE-continued

|  | Example 1 | Example 2 | Comparative Example A |
|---|---|---|---|
| fine grains <0.25 mm (in %) |  |  |  |
| Chlorine content in the polymer (ppm) | 28 | 16 | 60 |

We claim:

1. In olefin polymerization catalyst system containing, as active constituents, a) a titanium-containing solid component prepared from a titanium compound, a magnesium compound, a halogen and a carboxylic acid ester, and as cocatalyst, b) an aluminum compound, the improvement comprising using in the solid component a diester of a carboxylic acid of the formula Ia or Ib

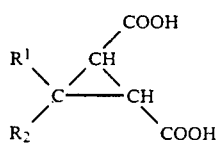   (Ia)

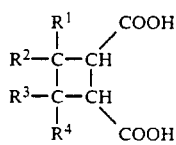   (Ib)

where $R^1$, $R^2$ and $R^3$ and $R^4$ are identical or different and are hydrogen, $C_1$- to $C_{15}$-alkyl, $C_7$- to $C_{15}$-alkylaryl, or 5- to 7-membered cycloalkyl, which may itself carry $C_1$ to $C_{10}$-alkyl groups.

2. A catalyst system as claimed in claim 1, which contains, in addition to the titanium-containing solid component a), a further electron donor c) as cocatalyst in addition to the aluminum compound b).

3. A catalyst system as defined in claim 1, which contains a diester of a 3- or 4-membered cycloalkyl-1,2-dicarboxylic acid of the formula Ia or Ib, where $R^1$, $R^2$, $R^3$ and $R^4$ are identical or different and are hydrogen or $C_1$- to $C_8$-alkyl.

4. A catalyst system as claimed in claim 1, in which the aluminum compound b) is a trialkylaluminum compound in which the alkyl groups each have from 1 to 8 carbon atoms.

5. A catalyst system as claimed in claim 2, wherein the further electron donor c) is a silicon compound of the formula II $$R_n^5 Si(OR^6)_{4-n} \quad (II)$$

where $R^5$ is $C_1$–$C_{20}$-alkyl, 5- to 7- membered cycloalkyl, which may itself carry a $C_1$-14 $C_{10}$-alkyl group, or $C_8$–$C_{20}$-aryl or arylalkyl, $R^6$ is $C_1$–$C_{20}$-alkyl, and n is 1, 2 or 3.

6. A catalyst system as defined in claim 1, wherein the titanium-containing solid component a) contains $SiO_2 \cdot aAl_2O_3$ as carrier material, where a is from 0 to 2.

7. In an olefin polymerization catalyst system containing, as active constituents, a) a titanium-containing solid component prepared from a titanium compound, a magnesium compound, a halogen and a carboxylic acid ester, and as cocatalyst, b) an aluminum compound, the improvement comprising using in the solid component a diester of a carboxylic acid of the formula Ia

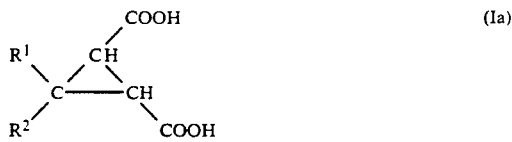   (Ia)

where $R^1$ and $R^2$ are identical or different and are hydrogen, $C_1$- to $C_{15}$-alkyl, $C_7$- to $C_{15}$-alkylaryl, or 5- to 7-membered cycloalkyl, which may itself carry $C_1$- to $C_{10}$-alkyl groups.

8. A catalyst system as defined in claim 7, where $R^1$ and $R^2$ are identical or different and are hydrogen or $C_1$ to $C_8$-alkyl.

9. A catalyst system as defined in claim 7, in which the aluminum compound b) is a trialkylaluminum compound in which the alkyl group each have from 1 to 8 carbon atoms.

10. A catalyst system as defined in claim 7, wherein the titanium-containing solid component a) contains $SiO_2 \cdot aAl_2O_3$ as carrier material, where a is from 0 to 2.

11. A process for the preparation of a titanium-containing solid component a) in an olefinpolymerization catalyst system which comprises:
   a) adding, in the first step, a solution of a magnesium-containing compound in a liquid alkane to the finely divided carrier material at from 10° to 120° C., subsequently adding a halogen or a hydrogen halide in an at least two-fold molar excess, based on the magnesium-containing compound, and, after from about 30 to 120 minutes, separating the solid from the liquid phase,
   b) then introducing the resultant solid into a liquid alkane and adding to the mixture a $C_1$–$C_8$-alkanol, a halide or an alkoxide of trivalent or tetravalent titanium and the cycloalkyl-1,2-dicarboxylate of the formula Ia or Ib at from 10° to 150°, from 1 to 5 mol of alkanol, from 2 to 20 mol of trivalent or tetravalent titanium and from 0.01 to 1 mol of the cycloalkyl-1,2-dicarboxylate being used per mol of magnesium in the solid obtained in the first step, and subsequently filtering off the resultant solid and washing it with a $C_7$–$C_{10}$-alkylbenzene,
   c) then, in a third step, extracting the solid obtained in the second step for several hours at from 100° to 150° C. with excess titanium tetrachloride or an excess of a solution of titanium tetrachloride in an inert solvent, and subsequently washing the product with a liquid alkane until the content of titanium tetrachloride in the washings is less than 2% by weight.

* * * * *

UNITED STATES PATENT AND TRADEMARK OFFICE
CERTIFICATE OF CORRECTION

PATENT NO. : 5,166,113

DATED : NOV. 24, 1992

INVENTOR(S) : SCHWAGER et al.

It is certified that error appears in the above-identified patent and that said Letters Patent is hereby corrected as shown below:

On the title page, item [54] and col. 1, line 1, "ZIEGER" should read --ZIEGLER--

On title page, item [73] add, --BASF Aktiengesellschaft, Ludwigshafen, Fed. Rep. of Germany-- claim 1, column 7, line 11: "In olefin" should read --In an olefin--
claim 2, column 7, line 36: "claimed" should read --defined--
claim 4, column 7, line 43: "claimed" should read --defined--
claim 5, column 7, line 49: "claimed" should read --defined--
claim 5, column 7, line 55: "$C_1-14C_{10}$-alkyl" should read --$C_1-C_{10}$-alkyl-- claim 5, column 7, line 56: "$C_8-C_{20}$-aryl" should read --$C_6-C_{20}$-aryl--

Signed and Sealed this

Twenty-sixth Day of October, 1993

Attest:

BRUCE LEHMAN

Attesting Officer    Commissioner of Patents and Trademarks